United States Patent
Thomas et al.

(10) Patent No.: US 9,840,939 B2
(45) Date of Patent: Dec. 12, 2017

(54) VARIABLE FUEL GAS MOISTURE CONTROL FOR GAS TURBINE COMBUSTOR

(71) Applicant: General Electric Company, Schenectady, NY (US)

(72) Inventors: Stephen Thomas, Greenville, SC (US); Stephen Kent Fulcher, Greenville, SC (US)

(73) Assignee: General Electric Company, Schenectady, NY (US)

( * ) Notice: Subject to any disclaimer, the term of this patent is extended or adjusted under 35 U.S.C. 154(b) by 630 days.

(21) Appl. No.: 14/330,804

(22) Filed: Jul. 14, 2014

(65) Prior Publication Data

US 2016/0010509 A1    Jan. 14, 2016

(51) Int. Cl.
| | |
|---|---|
| *F01K 21/04* | (2006.01) |
| *F02C 7/224* | (2006.01) |
| *F01K 17/06* | (2006.01) |
| *F01K 23/10* | (2006.01) |

(52) U.S. Cl.
CPC ............ *F01K 21/04* (2013.01); *F01K 17/06* (2013.01); *F01K 23/10* (2013.01); *F02C 7/224* (2013.01); *Y02E 20/16* (2013.01)

(58) Field of Classification Search
CPC .......... F01K 17/04; F01K 17/06; F01K 23/10; F02C 7/224; F02C 3/30; F02C 3/305; Y02E 20/16
See application file for complete search history.

(56) References Cited

U.S. PATENT DOCUMENTS

| | | | | |
|---|---|---|---|---|
| 6,370,880 B1 * | 4/2002 | Smith | ................... | F01K 21/047 60/39.53 |
| 6,389,794 B2 * | 5/2002 | Ranasinghe | .......... | F01K 23/106 60/39.182 |
| 6,502,402 B1 * | 1/2003 | Smith | ................... | F01K 21/047 60/39.3 |
| 6,694,774 B1 | 2/2004 | Rashad et al. | | |
| 8,126,629 B2 | 2/2012 | Buchalter et al. | | |
| 2009/0101822 A1 | 4/2009 | Mitra et al. | | |
| 2009/0271085 A1 * | 10/2009 | Buchalter | ............... | F23N 1/002 701/100 |
| 2010/0146984 A1 * | 6/2010 | Carroni | ................. | F01K 21/047 60/775 |

* cited by examiner

*Primary Examiner* — Gerald L Sung
*Assistant Examiner* — Stefan Ibroni
(74) *Attorney, Agent, or Firm* — Nixon & Vanderhye P.C.

(57) ABSTRACT

In one or more of the inventive aspects, when a gas turbine system of a power plant operates at part load, a moisture content of fuel gas provided to the gas turbine system may be controlled so as to minimize combustion dynamics and/or to comply with emission requirements. The fuel gas moisture content may be controlled by modulating a flow of heated water to a fuel moisturizer. By using heated water from a heat recovery steam generator to moisturize the fuel gas, heat energy from the water may be transferred to the fuel gas, and the overall mass flow may be enhanced to thereby increase overall combined cycle efficiency.

15 Claims, 4 Drawing Sheets

VARIABLE FUEL GAS MOISTURE CONTROL FOR GAS TURBINE COMBUSTOR

One or more aspects of the present invention relate to moisturizing fuel for combustion in a combustor of a gas turbine. In particular, one or more aspects of the present invention relate to controlling the moisture content of the fuel to operate the combustor under different operating conditions.

BACKGROUND OF THE INVENTION

A gas turbine may be incorporated in a combined cycle power plant. As the name suggests, a typical combined cycle power plant combines two or more thermal cycles within a single power plant. There are normally two cycles in a combined cycle power plant classified as "topping" and "bottoming" cycles. Most or all heat is supplied in the topping cycle. The waste heat produced in the topping cycle is utilized in the bottoming cycle, which operates at a lower temperature level than the topping cycle.

Generally, a combined cycle power plant includes a gas turbine, a steam turbine, a heat recovery steam generator, a performance heater and a fuel moisturizer. Dry fuel gas enters the system in the fuel moisturizer, where the fuel gas is moisturized with water before entering the performance heater. After being superheated, the moist fuel gas enters the gas turbine system for combustion. The effluents from the combustion reaction expand in the gas turbine driving a rotor coupled to a load, e.g., to generate electricity. The exhaust from the gas turbine enters the heat recovery steam generator, which utilizes the heat from the gas turbine exhaust to generate steam for use in the steam turbine. The steam generated in the heat recovery steam generator expands in the steam turbine generating additional power.

Fuel moisturization can improve overall combined cycle performance of the power plant. When fuel is moisturized, the fuel properties do change, which in turn have an effect on the operations of the gas turbine.

BRIEF SUMMARY OF THE INVENTION

A non-limiting aspect of the present invention relates to a fuel gas moisturization system of a power plant. The system may include a heat recovery steam generator, a fuel moisturizer and a performance heater. The heat recovery steam generator may be configured to heat water using exhaust heat of a gas turbine system, and output the heated water via a heater water conduit. The a fuel moisturizer may be configured to receive dry fuel gas via a dry fuel gas conduit, receive heated water from the heat recovery steam generator via the heater water conduit moisturize the dry fuel gas with the heated water, and output the moisturized fuel gas via a pre-superheated fuel gas conduit. The performance heater may be configured to receive the moisturized fuel gas from the fuel moisturizer via the pre-superheated fuel gas conduit, superheat the moisturized fuel gas, and provide the superheated fuel gas to the gas turbine system via a superheated fuel gas conduit. When the gas turbine system is operating at a part load, the fuel moisturizer may be configured such that a moisture content of the moisturized fuel gas is varied in accordance with a generator output of the gas turbine system. Part load may be a load on the gas turbine system less than a base load. Also, the moisture content of the moisturized fuel gas may not be constant throughout a range of the part load operation.

Another non-limiting aspect of the present invention relates to a power plant. The power plant may include a gas turbine system, a heat recovery steam generator, a fuel moisturizer, a performance heater, a gas turbine sensor and a controller. The gas turbine system may be configured to receive superheated fuel gas via a superheated fuel gas conduit, and generate power by combusting the superheated fuel gas. The heat recovery steam generator may be configured to heat water using exhaust heat of the gas turbine system, and output the heated water via a heater water conduit. The a fuel moisturizer may be configured to receive dry fuel gas via a dry fuel gas conduit, receive heated water from the heat recovery steam generator via the heater water conduit moisturize the dry fuel gas with the heated water, and output the moisturized fuel gas via a pre-superheated fuel gas conduit. The performance heater may be configured to receive the moisturized fuel gas from the fuel moisturizer via the pre-superheated fuel gas conduit, superheat the moisturized fuel gas, and provide the superheated fuel gas to the gas turbine system via a superheated fuel gas conduit. The gas turbine sensor may be configured to determine gas turbine sensor information. The gas turbine sensor information may include one or more properties of the gas turbine including a generator output of the gas turbine. The controller may be configured to determine whether the gas turbine system is operating at a part load based on the gas turbine sensor information. Part load may be a load on the gas turbine system less than a base load. When the gas turbine system is operating at the part load, the controller may control the operations of the power plant so as to vary a moisture content of the moisturized fuel gas output from the fuel moisturizer in accordance with the generator output of the gas turbine system. The controller may control the operations of the power plant such that moisture content of the moisturized fuel gas is not constant throughout a range of the part load operation.

The invention will now be described in greater detail in connection with the drawings identified below.

BRIEF DESCRIPTION OF THE DRAWINGS

These and other features of the present invention will be better understood through the following detailed description of example embodiments in conjunction with the accompanying drawings, in which.

DETAILED DESCRIPTION OF THE INVENTION

One or more aspects of a novel fuel moisturization control are described. Among many advantages, the inventive aspects allow control of fuel moisturization over various operations of the gas turbine and thus provide improved operability and reduced combustion dynamics.

Figure 1:
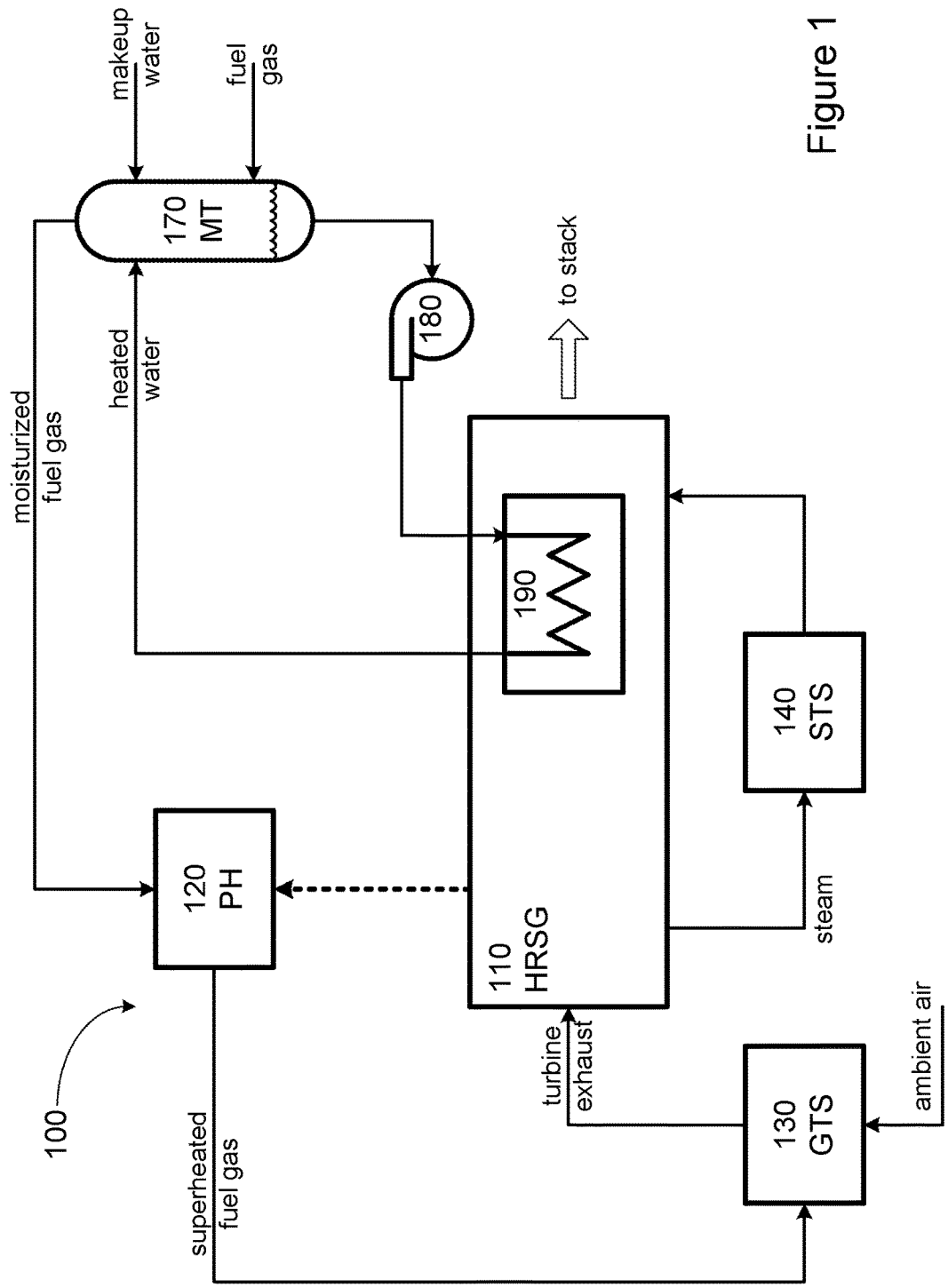
FIG. 1 illustrates a simplified combined cycle power plant according to an embodiment of the present invention.

A schematic of an example combined cycle power plant is illustrated in FIG. 1. The example power plant 100 includes a fuel moisturization system. This schematic is used for illustrative purposes, and the present invention is not intended to be limited solely to usage in this type of power plant. The concepts described herein may also be used in a simple cycle gas turbine power plant.

The example power plant 100 may be a combination of gas and steam turbines. Typically, gas turbines are the prime movers to generate power. These gas turbine engines typically have high exhaust flows and relatively high exhaust temperatures. Steam is produced by directing the exhaust gases to a heat recovery steam generator (HRSG). The produced steam is directed to a steam turbine to produce additional power. In this manner, a gas turbine produces work via the Brayton Cycle, and the steam turbine produces work via the Rankine Cycle.

As seen, the power plant 100 may include a fuel moisturizer 170 (e.g., in the form of a moisturizing tower or MT), a gas turbine system 130, a steam turbine system 140, a HRSG 110, a water heater 190, a performance heater 120, and a spent water pump 180. While not explicitly shown, it should be recognized that the gas turbine system 130 would typically include a compressor, a combustor, a gas turbine and so on. Likewise, the steam turbine system 130 would typically include a steam turbine, a condenser, a condenser extraction pump (CEP) and so on.

During operation of the power plant 100, inputs to the process may include a dry fuel gas stream, a makeup water stream, and an ambient air stream. The outputs of the process may include a stack gas stream. A principle output may be electrical energy from a generator (not shown) coupled to the gas and steam turbine systems 130, 140.

Dry fuel gas provided via the fuel gas stream may be bubbled through the fuel moisturizer 170 to moisturize the fuel gas. The moisturized fuel gas exiting the top of the fuel moisturizer 170 may be provided to the performance heater 120, which in turn may superheat the moisturized fuel gas using a bottoming cycle heat source from the HRSG 110. The superheated fuel may be provided to the gas turbine system 130 for combustion, and the hot exhaust of the gas turbine system 130 may be directed to the HRSG 110 for heat recovery, and the exhaust gas can exit to the stack. The HRSG 110 may use the recovered heat to generate steam, which may then be used by the steam turbine system 140. The gas turbine system 130 and the steam turbine system 140 may drive a generator (not shown) for generating electricity. The effluents from the steam turbine system 140 may be condensed and returned to the HRSG 110.

Spent water leaving the bottom of the fuel moisturizer 170 may be pumped by the spent water pump 180 to the HRSG 110 so as to be heated by the water heater 190. The water heater 190 may be an economizer of the HRSG 110, and thus may heat the water using the turbine exhaust from the gas turbine system 130. The heated water may be returned to the fuel moisturizer 170 to moisturize the dry fuel gas. Makeup water may be added to the fuel moisturizing water to replace the water component of the moisturized fuel gas exiting with the moisturized fuel gas, and any blowdown from the fuel moisturizing vessel (not shown).

As mentioned above, fuel moisturization can improve performance of a gas turbine power plant. Power generated from gas turbine system is generally a combination of two factors: temperature drop of the combusted fuel through the gas turbine (thermal conversion of heat energy to work energy) and mass flow (transfer of mechanical energy of the flowing combusted fuel to the turbine). Moisturizing the fuel can increase the mass flow, and thus enhance power generation. Fuel moisturization may also enhance the thermal conversion. Thus, even a simple cycle gas turbine system can benefit from fuel moisturization.

But in one or more aspects, additional benefits may be realized in a combined cycle setting. As alluded to above, the HRSG 110 may generate steam using the exhaust heat from the gas turbine system 130, and the steam may be used in the steam turbine system 140 to produce additional work. The HRSG 110 can also be used to provide heated water, e.g., from a bottoming cycle, to the performance heater 120 to superheat the fuel gas, and the superheated fuel gas may be provided to the gas turbine system 130. Such superheating enhances the output of the gas turbine system 130.

In a steam cycle engine, power of the steam is captured in the steam turbine. When HRSG 110 is used to heat water, not all of the water may turn into steam. This means that heat added to the water that remains in liquid form cannot be used perform useful work.

But in one or more embodiments, it is proposed to moisturize the fuel using the heated water from the HRSG 110. The realized benefits include at least the following. First, fuel moisturization increases mass flow. Second, using the heated water pre-heats the fuel. This allows the use of heat that would have been unusable otherwise. In this way, the combined cycle efficiency may be enhanced. The heated water may be from an economizer. That is, the water heater 190 may be an economizer of the HRSG 110.

It is thus seen that using heated water to moisturize the fuel gas adds both heat and mass to the fuel stream, which can be beneficial as described above. However, when the fuel is moisturized, the fuel properties can change, which in turn can have an effect on the operations of the gas turbine system. In particular, the changes in the fuel properties as a result of moisturization can have an effect on the fuel-air distribution and resultant combustion system dynamics and/or emissions.

Briefly, combustion dynamics may be described as pressure fluctuations in the combustor of a gas turbine system. The fluctuations can be so rapid that they manifest as an acoustic phenomena, i.e., as sound waves. The combustion dynamics can be severe enough cause damage to equipments. Thus, it is desirable to minimize combustion dynamics, i.e., it is desirable to make the gas turbine operate as quietly as possible.

At base load, the operability and emissions of the gas turbine are normally acceptable. However, part load operations may be hampered by the combustion dynamics. Inventors of this disclosed subject matter realized that at part load operation, varying the amount of moisture can have an effect the gas turbine combustion dynamics of the gas turbine. For example, it has been noted that reducing the fuel moisture content at part load is beneficial to operability, and permits the gas turbine system to operate at lower loads in emissions compliance.

Thus, in one or more aspects, it is proposed to control the fuel moisture content as a function of the generator output of the gas turbine system, e.g., during part load operation of the gas turbine. In one embodiment, the fuel moisture content can be controlled by modulating the flow of heated water to the fuel moisturizer. It should be noted that factors such as combustion reference temperature and/or inlet guide vane (IGV) angle may be taken into consideration when modulating the heated water flow. That is, the fuel moisture content may be controlled as a function of any combination of the generator output, combustion reference temperature, and IGV angle.

The fuel moisture content may be expressed as any one or more of the following: as mass percent (e.g., as a percentage of the total mass of the fuel gas stream due to water), as volume percent (e.g., as a percentage of the total volume due to water), as mass ratio (e.g., ratio of masses of water relative to fuel), as volume ratio (ratio of volume of water relative to fuel), etc.

Figure 2:
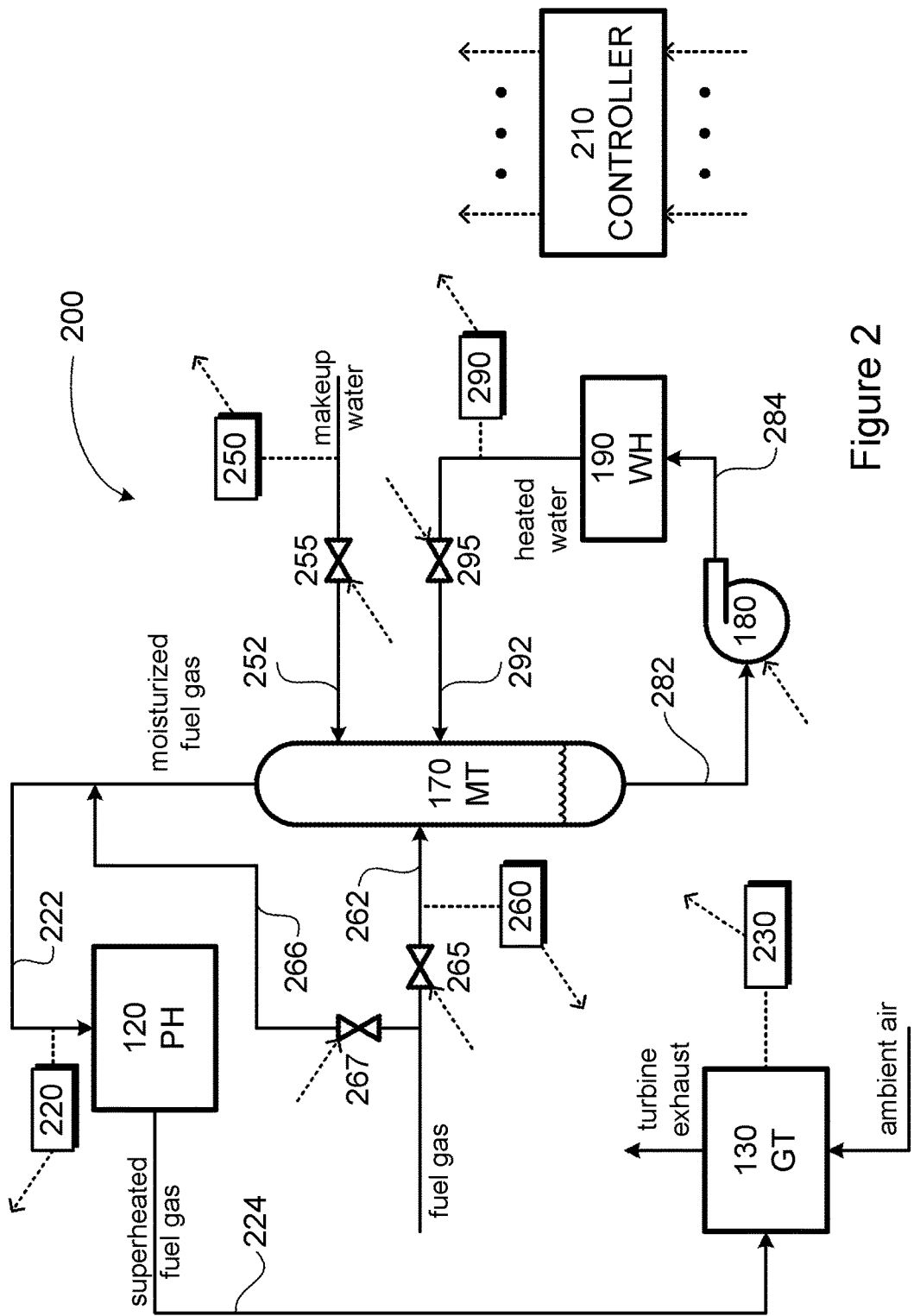
FIG. 2 illustrates a control system of a combined cycle power plant according to an embodiment of the present invention.

FIG. 2 illustrates an example combined cycle power plant according to a non-limiting embodiment. So as to minimize clutter, not all of the components of FIG. 1 are repeated. In FIG. 2, the fuel moisturizer 170 may moisturize the dry fuel gas input to the fuel moisturizer 170 via a dry fuel gas conduit 262, and the moisturized fuel gas may be provided to the performance heater 120 via a pre-superheated fuel gas conduit 222. A portion of the fuel gas—ranging from zero to all—may bypass the moisturization altogether via a dry fuel gas diversion conduit 266. The performance heater 120 may superheat the fuel gas (any combination of moisturized and unmoisturized), and the superheated fuel gas may enter the gas turbine system 130 via a superheated fuel gas conduit 224.

The example CCPC 200 may include a controller 210 configured to control the overall functioning of the power plant 200. That is, the controller 210 may be configured to control one or more operations of the power plant 200 by controlling the one or more components of the power plant 200.

As an illustration, when the gas turbine system 130 is operating at part load (i.e., less than base load), the controller 210 may control any one or more of the bottoms pump 180, a makeup water valve 255, a dry fuel gas valve 265, a dry fuel gas diversion valve 267, a heated water valve 295 to modulate the moisture content of the fuel gas provided to the performance heater 120. For example, by controlling one or both of the bottoms pump 180 and the heated water valve 295, the amount of heated water used for fuel moisturization may be controlled. By controlling the makeup water valve 255, the amount of makeup water used for moisturization may be controlled. By controlling the dry fuel gas valve 265, an amount of dry fuel gas to be moisturized may be controlled. By controlling the dry fuel gas diversion valve 267, an amount of dry fuel gas to remain unmoisturized may be controlled. Of course, any combination of these components may be manipulated to finely tune the moisture content.

The controller 210 may be configured to control the functioning of the power plant 200 based on sensor information from any one or more of a pre-superheated fuel gas sensor 220, a gas turbine system sensor 230, a makeup water sensor 250, a dry fuel gas sensor 260, and a heated water sensor 290. The pre-superheated fuel gas sensor 220 may be configured to detect or otherwise determine one or more properties of the fuel gas flowing in the pre-heated fuel gas conduit 222. Examples of properties may include moisture content, temperature, pressure, flow rate, etc. The gas turbine system sensor 230 may be configured to detect or otherwise determine one or more properties of the gas turbine system 130. Examples include the gas turbine system output, combustion reference temperature, and IGV angle. The makeup water sensor 250 may be configured to detect or otherwise determine one or more properties of the makeup water flowing in the makeup water conduit 252. Examples may include temperature, pressure, flow rate, etc. The dry fuel gas sensor 260 may be configured to detect or otherwise determine one or more properties of the dry fuel gas flowing in the dry fuel gas conduit 262. Examples may include energy content (e.g., Wobbe index), temperature, pressure, flow rate, etc. The heated water sensor 290 may be configured to detect or otherwise determine one or more properties of the water flowing in the heated water conduit 292. Examples of properties may temperature, pressure, flow rate, etc.

Figure 3:
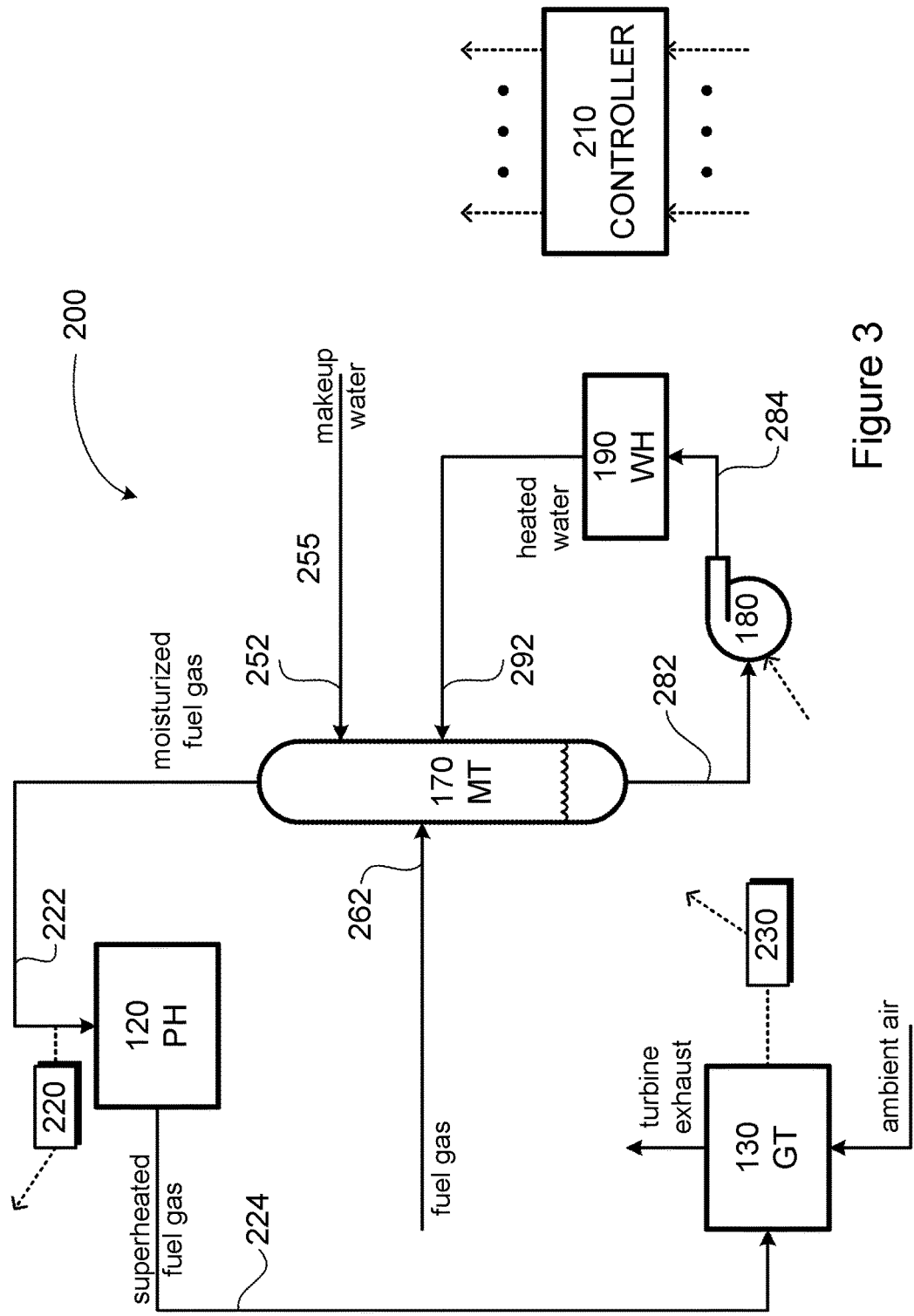
FIG. 3 illustrates a simplified configuration to a combined cycle power plant according to an embodiment of the present invention.

It should be noted that not all of the components shown in FIG. 2 are required. This is illustrated in FIG. 3 which is a simplified version of the system illustrated in FIG. 2. It should be noted that FIG. 3 is but one of many possible alternatives (not all alternatives shown). In FIG. 3, the controller 210 is illustrated to control the spent water pump 180 based on sensor information from the GT sensor 230. For example, the GT sensor 230 may detect the generator output of the gas turbine system 130. Based on this information, the controller 210 may control the spent water pump 180 which pumps the spent water received via a spent water conduit 282 to the water heater 190 via a pre-reheat water conduit 284. In this configuration, the amount of water heated by the water heater 190 and provided to the moisturizer 170 is dictated, at least in part, by the spent water pump. Thus, by controlling the spent water pump 180, the moisture content of the fuel gas may be modulated.

Finer control may be realized with additional sensor information. In FIG. 3, the additional sensor information maybe from the pre-heated fuel gas sensor 220 providing sensor information regarding the fuel moisture content of the fuel gas in the pre-superheated fuel gas conduit 222. The pre-heated fuel gas sensor 220 may directly indicate the fuel moisture content or may provide other sensor information sufficient for the controller 210 to calculate the fuel moisture content.

Figure 4:
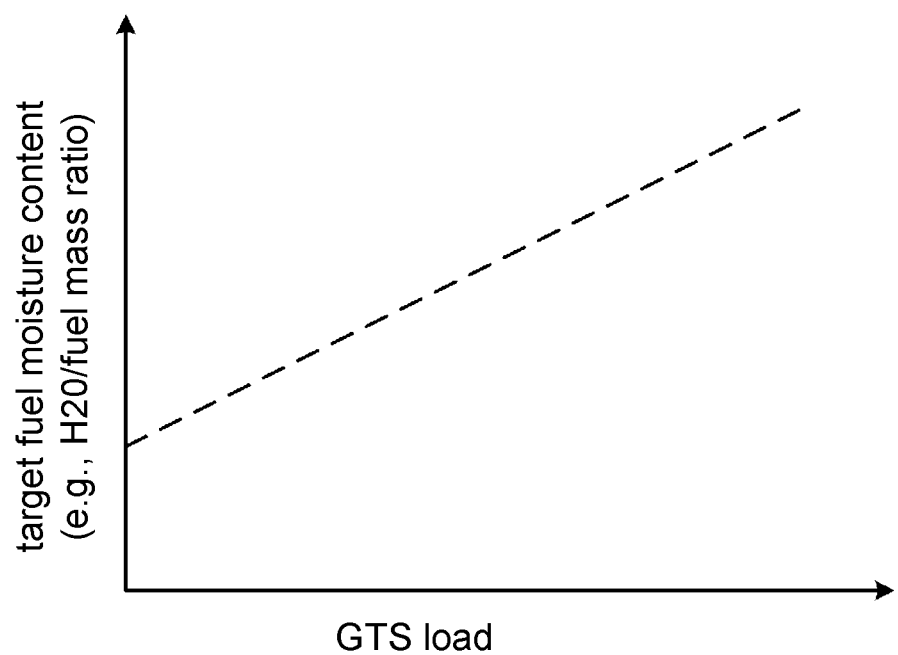
FIG. 4 illustrates a graph relating gas turbine load to fuel moisture content.

During the part load operation, there may be different targeted levels of the fuel moisturization depending on the state of the gas turbine system 130. This is illustrated in FIG. 4 is a graph mapping the desired fuel moisture content (e.g., as a ratio of mass of water to fuel) to the gas turbine system load (generator output of the gas turbine system) when the gas turbine system 130 is operating at part load. In this example, it is seen that the target fuel moisture content level generally increases with the gas turbine system load from some minimum level (e.g., at start up) to some maximum level (e.g., at base load). The relationship is shown as being linear for simplicity. However, the actual relationship may be more complex. In this example, the target fuel moisturization content level is shown as varying throughout different load levels, i.e., is not constant throughout the range of the part load operation.

Also, while not explicitly shown, the target fuel moisture content level may also differ based on the combustion reference temperature and/or the IGV angle. Thus, the target moisture content level based on any combination of the load, the combustion reference temperature, and the IGV angle of the gas turbine system. Having determined the target fuel moisturization level, the controller 210 may control any of the components of the power plant 200 to achieve the target.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuel gas moisturization system of a power plant, the system comprising:
a heat recovery steam generator (HRSG) configured to heat water using exhaust heat of a gas turbine system to create heated water, and output the heated water via a heater water conduit;
a fuel moisturizer configured to receive dry fuel gas via a dry fuel gas conduit, receive the heated water from the HRSG via the heater water conduit, moisturize the dry fuel gas with the heated water to create a moisturized fuel gas, and output the moisturized fuel gas via a pre-superheated fuel gas conduit; a performance heater configured to receive the moisturized fuel gas from the fuel moisturizer via the pre-superheated fuel gas conduit, superheat the moisturized fuel gas to create a superheated fuel gas, and provide the superheated fuel gas to the gas turbine system via a superheated fuel gas conduit, and a controller configured to, in response to the gas turbine system operating at a part load, actuating the fuel moisturizer such that a moisture content of the moisturized fuel gas is varied in accordance with an output of a generator driven by the gas turbine system, the part load being less than a base load, and
wherein the moisture content of the moisturized fuel gas is not constant throughout a range of the part load.

2. The system of claim 1, wherein when the gas turbine system is operating at the part load, the fuel moisturizer is configured such that the moisture content of the moisturized fuel gas is varied to increase/decrease as the output of the generator driven by the gas turbine system increases/decreases.

3. The system of claim 1, wherein when the gas turbine system is operating at the part load, the fuel moisturizer is configured such that an amount of the heated water from the HRSG used to moisturize the dry fuel gas is varied in accordance with the output of the generator driven by the gas turbine system.

4. The system of claim 1, wherein when the gas turbine system is operating at the part load, the fuel moisturizer is configured such that the moisture content of the moisturized fuel gas is varied also in accordance with one or both of a combustion reference temperature and an inlet guide vane (IGV) angle of the gas turbine system.

5. A power plant comprising:
a gas turbine system configured to receive superheated fuel gas via a superheated fuel gas conduit, and generate power by combusting the superheated fuel gas;
a heat recovery steam generator (HRSG) configured to heat water using exhaust heat of the gas turbine system to create heated water, and output the heated water via a heater water conduit;
a fuel moisturizer configured to receive dry fuel gas via a dry fuel gas conduit, receive the heated water from the HRSG via the heater water conduit, moisturize the dry fuel gas with the heated water to create a moisturized fuel gas, and output the moisturized fuel gas via a pre-superheated fuel gas conduit;
a performance heater configured to receive the moisturized fuel gas from the fuel moisturizer via the pre-superheated fuel gas conduit, superheat the moisturized fuel gas to create a superheated fuel gas, and provide the superheated fuel gas to the gas turbine system via the superheated fuel gas conduit;
a gas turbine sensor configured to determine gas turbine sensor information comprising one or more properties of the gas turbine, the gas turbine sensor information including output information indicating an output of a generator driven by the gas turbine; and
a controller configured to determine whether the gas turbine system is operating at a part load based on the gas turbine sensor information from the gas turbine sensor, the part load being less than a base load, and control operations of the power plant so as to vary a moisture content of the moisturized fuel gas output from the fuel moisturizer in accordance with the output of the generator driven by the gas turbine system when the gas turbine system is operating at the part load,
wherein the controller controls the operations of the power plant such that the moisture content is not constant throughout a range of the part load.

6. The power plant of claim 5, wherein when the gas turbine system is operating at the part load, the controller is configured to control the operations of the power plant so as to increase/decrease the moisture content of the moisturized fuel gas as the load driven by the gas turbine system increases/decreases.

7. The power plant of claim 5, wherein when the gas turbine system is operating at the part load, the controller is configured to control the operations of the power plant so as to vary an amount of the heated water from the HRSG used to moisturize the dry fuel gas in accordance with the load driven by the gas turbine system.

8. The power plant of claim 5, further comprising:
a spent water pump configured to receive spent water from the fuel moisturizer via a spent water conduit, and pump the spent water to the HRSG for heating the spent water,
wherein when the gas turbine system is operating at the part load, the controller is configured to control the spent water pump to vary an amount of the spent water pumped to the HRSG in accordance with the output of the generator driven by the gas turbine system.

9. The power plant of claim 8, further comprising:
a heated water sensor configured to determine heated water sensor information comprising one or more properties of the heated water flowing in the heated water conduit,
wherein when the gas turbine system is operating at the part load, the controller is configured to control the spent water pump also based on the heated water sensor information.

10. The power plant of claim 8, wherein the heated water sensor information comprises any one or more of a pressure, a temperature, and a flow rate.

11. The power plant of claim 5, further comprising:
a heated water valve configured to regulate an amount of the heated water flowing in the heated water conduit,
wherein when the gas turbine system is operating at the part load, the controller is configured to control the heated water valve to vary the amount of the heated water flowing in the heated water conduit in accordance with the output of the generator driven by the gas turbine system.

12. The power plant of claim 5, further comprising:
a dry fuel gas valve configured to regulate an amount of the dry fuel gas flowing in the dry fuel gas conduit,
wherein when the gas turbine system is operating at the part load, the controller is configured to control the dry fuel gas valve to vary the amount of the dry fuel gas flowing in the dry fuel gas conduit in accordance with the output of the generator driven by the gas turbine system.

13. The power plant of claim 12, further comprising:

a dry fuel gas sensor configured to determine dry fuel sensor information comprising one or more properties of the dry fuel gas flowing in the dry fuel gas conduit, wherein when the gas turbine system is operating at the part load, the controller is configured to control the dry fuel gas valve also based on the dry fuel sensor information.

14. The power plant of claim 5, further comprising:

a dry fuel gas diversion conduit fluidly connecting between the dry fuel gas conduit and the pre-superheated fuel gas conduit such that any dry fuel gas flowing in the dry fuel gas diversion conduit is diverted from being moisturized creating diverted dry fuel gas, the diverted dry fuel gas being mixed with the moisturized fuel gas exiting the fuel moisturizer; and a dry fuel gas diversion valve configured to regulate an amount of the diverted dry fuel gas flowing in the dry fuel gas diversion conduit, wherein when the gas turbine system is operating at the part load, the controller is configured to control the dry fuel gas diversion valve to vary the amount of the diverted dry fuel gas flowing in the flowing in the dry fuel gas diversion conduit in accordance with the output of the generator driven by the gas turbine system.

15. The power plant of claim 5, wherein the gas turbine sensor information also includes one or both of a combustion reference temperature and an inlet guide vane (IGV) angle, and wherein when the gas turbine system is operating at the part load, the controller is configured to control the operations of the power plant so as to vary the moisture content also in accordance with one or both of the combustion reference temperature and the IGV angle when the gas turbine system is operating at the part load.

* * * * *